United States Patent [19]

Maguire, Sr.

[11] 4,046,534

[45] Sept. 6, 1977

[54] METHOD FOR RECOVERING FRESH WATER FROM BRINE

[76] Inventor: James B. Maguire, Sr., P.O. Box 795, Oceanside, Calif. 92054

[21] Appl. No.: 354,677

[22] Filed: Apr. 26, 1973

[51] Int. Cl.² .............................................. B01D 9/04
[52] U.S. Cl. ........................................ 62/534; 62/542
[58] Field of Search ................. 62/532, 533, 534, 535, 62/541, 542, 544

[56] References Cited

U.S. PATENT DOCUMENTS

| | | | |
|---|---|---|---|
| 2,986,012 | 5/1961 | Toulmin | 62/58 |
| 3,049,889 | 8/1962 | Carfagno | 62/58 |
| 3,137,554 | 6/1964 | Gilliland et al. | 62/58 |
| 3,167,401 | 1/1965 | Herman | 62/58 |
| 3,250,081 | 5/1966 | Othmer | 62/58 |
| 3,283,522 | 11/1966 | Ganiaris | 62/58 |
| 3,285,022 | 11/1966 | Pike | 62/58 |
| 3,525,230 | 8/1970 | Smith | 62/58 |
| 3,662,562 | 5/1972 | Wiegandt | 62/58 |
| 3,803,860 | 4/1974 | Nagashima et al. | 62/58 |

*Primary Examiner*—Frank W. Lutter
*Assistant Examiner*—Frank Sever
*Attorney, Agent, or Firm*—Warren, Chickering & Grunewald

[57] ABSTRACT

A process is disclosed for recovering fresh water from brine which includes introducing brine, which has been inoculated with a predetermined number of ice nuclei and is at about its freezing temperature, into an elongated crystal growth zone which is supplied with refrigerant along the brine flow path at a graduated rate such that more refrigerant is supplied toward the outlet of the crystal growth zone than near the inlet. Ice crystals are separated from the resulting brine-ice slurry, and the ice crystals are washed with fresh water before being melted to recover fresh water.

9 Claims, 2 Drawing Figures

METHOD FOR RECOVERING FRESH WATER FROM BRINE

BACKGROUND OF THE INVENTION

Recovering fresh water from brine, such as sea water, is desirable to supplement the limited fresh water supply of the world. Technologically, the separation of fresh water from brine is relatively easy, but to effect such separation on an economic basis that would justify a process being used for municipal, industrial or agricultural supplies is difficult. Not only must such a process be economically justified, it must even be justified from an environment conservation viewpoint because the use of too much energy to recover fresh water from brine would produce a net detrimental effect on the ecology.

As used in this specification and the appended claims, the term brine is intended to include various sources of water that would not be considered fresh water whether they are from the ocean, lakes or wells; and it is also intended to include such materials as brackish water and municipal or industrial waste waters having high concentrations of dissolved inorganic material contained in them. The term fresh water is also employed in its generic sense to mean water having a low enough impurity content to be useful as industrial, municipal or agricultural water, such as that obtained from lakes, streams or fresh water wells.

In the past, various techniques have been used to recover fresh water from brine. Examples of such processes are evaporation which separates vapor phase water from brine, freezing processes which separate solid phase water from brine, semipermeable membrane processes which produce salt-enriched brine, and a salt-depleted fresh water, and ion exchange processes which substitute innocuous ions for damaging ones, to mention a few.

All of the above processes suffer from economic rather than technological problems. For example, evaporation processes produce fresh water adequate for almost any use but they are too expensive because the corrosiveness of boiling brine requires exotic metals for construction of large vessels and pieces of equipment. In addition to the expensive capitalization of such processes, scaling and salting on heat exchange surfaces requires frequent shutdowns for maintenance which is expensive from the operation point of view. Thus, even if the energy consumed in an evaporation process is very low, approaching only the heat of solution of the salt, evaporation processes by their very nature are too expensive to produce large quantities of water for municipal, industrial or agricultural use.

Ion exchange processes and processes employing semipermeable membranes are difficult to employ on scales large enough to produce reasonable amounts of fresh water, and these processes generally produce only salt-depleted streams rather than fresh water thereby requiring many stages of purification to produce a product that has general utility as fresh water. Stagewise processes require more equipment and energy than the single-stage freezing and evaporation processes, and they have accordingly not been successful for producing fresh water from brine.

Freezing processes have long been considered a good method for recovering fresh water from brine. Freezing processes have the advantage of using low temperatures where corrosion is not a significant factor and where ordinary carbon steel vessels and equipment can be employed. In addition, freezing processes do not produce salting out of the brine or scaling on heat exchange surfaces and they produce solid ice crystals that are relatively pure water from a single stage. The primary problem with freezing processes is that it is difficult to separate the ice crystals from the liquid brine and to wash the separated crystals in a manner to produce the desired water product within reasonable economic limits.

Crystals from freezing processes ordinarily are in the form of agglomerates with liquid brine trapped between them, and even when separate ice crystals are formed, they are in such dense, impermeable beds that they are not susceptible to washing processes. Thus, even though a freezing process will produce ice crystals of relatively pure water, the liquid phase recovered from such processes is not an adequate fresh water product unless expensive further processing is employed.

THE INVENTION

This invention is a process for obtaining fresh water from brine which overcomes the above-noted difficulties of the prior art. The process of this invention is a freezing process which produces individual large ice crystals of uniform size that remain unagglomerated and do not form dense beds so that they are permeable to water and therefore susceptible to being washed substantially clean of clinging brine.

Briefly, the process of this invention includes cooling a brine to about its freezing temperature and then inoculating it with a predetermined number of ice crystal nuclei, after which the inoculated brine is passed through an elongated crystal growth zone which is supplied with a refrigerant along substantially the entire path that the brine flows through it from the inlet to the outlet. In the crystal zone the equilibrium freezing temperature of the brine, which is defined as the temperature at which a stable slurry of solid ice crystals in a brine wall will be maintained, continues to be lowered as the concentration of the brine increases because fresh water is removed from it. The refrigerant is supplied substantially along the entire flow path of brine through the crystal growth zone in a graduated manner such that the temperature of the brine at any point in the crystal growth zone is from about 0.2° to 3.0° F below its equilibrium freezing point. To obtain this temperature difference it is necessary to supply refrigerant to the crystal growth zone in a graduated manner with more refrigerant supplied toward the outlet. There results a brine-ice slurry which contains individual, unagglomerated ice crystals of uniform size and which is removed from the crystal growth zone and passed to a separate zone in which brine is drained from the ice crystals after which the ice crystals are washed with fresh water to remove liquid brine from their surfaces. The washed crystals are then melted to produce the fresh water product from the process.

Although it is not intended to limit the process to the following hypothesis, it is thought that nucleus formation and crystal growth are two separate processes. The formation of nuclei is unpredictable and depends on factors that are difficult to anticipate. For example, it is well known that pure water may be supercooled well below its freezing point without the formation of solid ice, but that the introduction of a seed crystal or even the act of scratching the inside of the container may cause almost instantaneous precipitation of small ice crystals throughout the entire mass of supercooled water. On the other hand, when nuclei on which ice crystals may grow are present, the growth of crystals is very orderly and proceeds along predictable lines.

Freezing of ice in the past has been evaluated as a process for removing heat and substantially nothing more. Thus, when ice was desired, one lowered the temperature below the freezing point; and if ice was desired at a more rapid rate, one lowered the temperature further below the freezing point. If one is prepared to accept ice as a product without discriminating between the various forms of ice, the foregoing is a rational approach to the problem of obtaining it.

In a process for recovering fresh water from brine by producing ice crystals of fresh water in the brine, particularly when the form of the crystals recovered is important with regard to how well they may be washed and even more particularly with regard to the economics of the process in the freezing of ice, the foregoing observations on how to conduct a freezing process are not accurate. Crystal growth is a regular process that operates at a given rate which cannot be indefinitely incrementally accelerated by incrementally lowering the temperature. When a slurry of ice in brine exists at the equilibrium freezing point of the brine, a stable system exists and there is not driving force toward crystal growth nor toward crystal melting. When the temperature is lowered, an unstable system exists and the instability tends to relieve itself by crystal growth which supplies heat of fusion to the system to stabilize it by putting it back to equilibrium freezing temperature. If the temperature is lowered further, a greater degree of instability is introduced which cannot be relieved by crystal growth because the growth rate of crystals is limited. Accordingly, when the temperature is lowered to a greater degree, the system tends to stabilize via a different route which is the formation of new ice nuclei upon which more ice can freeze from the brine. If a system is held at a significantly lower temperature than the freezing point for too long a time, it will produce new nuclei. The result is a slurry of ice crystals in brine in which some of the ice crystals have been growing in the slurry for a long time and are therefore large, some of the crystals are from very recently formed nuclei and they are quite small, and the remainder of the crystals will be of every size intermediate between the largest crystal and the smallest crystals. Such a slurry is difficult to process because the crystals tend to agglomerate and they form densely packed beds in that smaller crystals fill the interstices between large crystals.

The process of this invention is effected to cooperate with the natural characteristics of slurries. The amount of fresh water recovered from brine may be predetermined by predetermining the number of ice crystals that will be recovered and their size. In the process of this invention, the number of ice crystals to be recovered is determined by the number of nuclei inoculated into brine at the inlet to the crystal growth zone. In the crystal growth zone conditions are maintained so that the degree of instability in the system is such that it is relieved only by crystal growth rather than by a combination of crystal growth and nucleus formation, and as a result each crystal recovered from the crystal growth zone is approximately the same size as each other crystal recovered from the crystal growth zone. The degree of instability that relieves itself by crystal growth is a temperature difference from the equilibrium freezing temperature of from about 0.2° to about 3.0° F, and, accordingly, a limitation of this invention is to maintain the brine at any given point in the crystal growth zone at a temperature of from about 0.2° to about 3.0° F lower than the equilibrium freezing temperature of the brine at that point in the crystal growth zone. It has been found that maintaining the temperature about 0.4° F lower than the equilibrium freezing temperature is an optimum degree of instability.

It has also been found that the amount of refrigeration required to maintain this degree of instability increases as the brine slurry follows its path through the elongated crystal growth zone. This can probably be attributed to the fact that if crystals grow at the same rate, increasing their diameter at a given rate per unit of time, the volume of water frozen increases at an exponential rate so that the heat of fusion also increases at an exponential rate.

Whether the foregoing analysis is entirely correct or not, it has been found that the product recovered from the crystal growth zone of the process of this invention is a slurry of separate, unagglomerated, large ice crystals in concentrated brine wherein the ice crystals are substantially uniform in size. This slurry, in accordance with this invention, is passed to a separation zone wherein ice crystals are separated from brine after which the ice crystals are washed, preferably with a portion of the fresh water recovered from the process and then melted to produce the fresh water product from the process.

The fresh water from the process of this invention is adequate for almost any large scale water use. It may be employed as municipal water in that it is suitable for drinking or cooking, it has a low enough salt content to be employed agriculturally for irrigation, and it may be employed for general industrial use.

DETAILED DESCRIPTION OF THE INVENTION

The invention may be better described with reference to the accompanying drawings.

Figure 1:
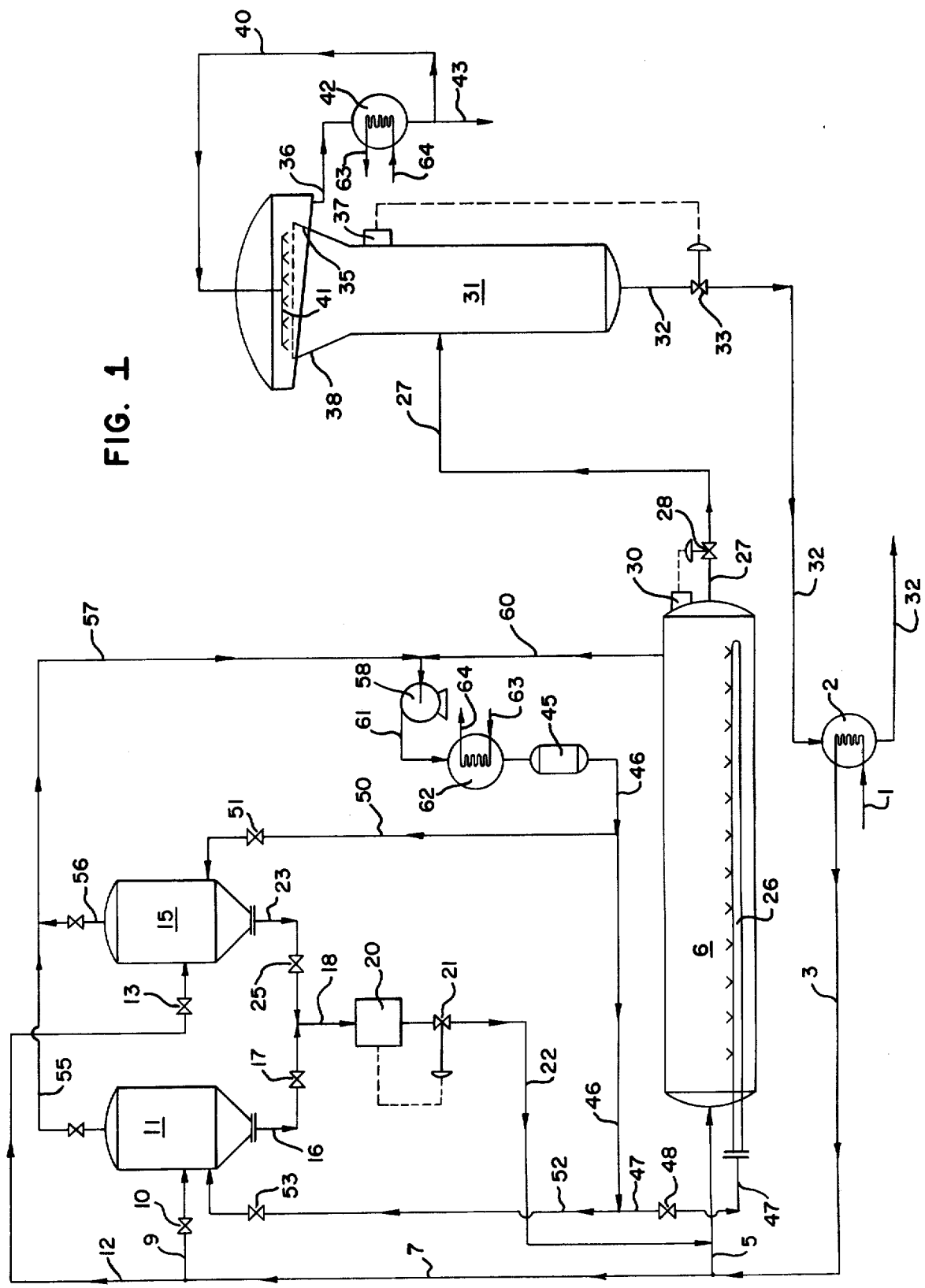
FIG. 1 is a schematic flow diagram of a process embodying this invention.

FIG. 1 is highly schematic and does not include obvious equipment such as valves, pumps, compressors, etc. except where the function of such equipment is required to illustrate the process. Brine from any suitable source is introduced through line 1 and precooled to about its equilibrium freezing point as indicated in the schematic diagram by heat exchange in heat exchanger 2 with a source of concentrated cold brine in line 32 which will be discussed hereinafter. If additional cooling is required to bring the brine to approximately its freezing point, such additional cooling may be provided by conventional refrigeration, or the introduction of a brine slurry of ice nuclei that is at temperature that is low enough to cool the incoming brine to about its freezing point. The brine flows from heat exchanger 2 through line 3 and is then divided so that a major portion of it flows through line 5 into crystal growth zone 6 and a minor portion flows through line 7 from which it can flow through line 8 and valve 10 into nucleus producing zone 11 or through line 12 and valve 13 into nucleus producing zone 15.

Each of nucleus producing zones 11 and 15 is supplied with refrigerant as will be hereinafter described and operated to produce a slurry of ice nuclei in brine.

Zones 11 and 15 are used alternately so that while one zone is supplying nuclei to the process, the other is operated to create nuclei in the brine within it. For this description, nucleus forming zone 11 is supplying nuclei to the process via line 16 and open valve 17. The slurry of nuclei in brine passes through line 18 and through a counter designated 20 which operates valves 21 in response to the number of nuclei passing through line 18. Through the operation of counter 20 and valve 21, a predetermined number of nuclei may pass through line 22 and may be inoculated into the stream of cooled brine in line 5 as it passes into crystal growth zone 6. The number of nuclei inoculated into the brine may also be regulated by determining the concentration of nuclei in zone 11 and simply controlling the flow rate from zone 11.

While nucleus forming zone 11 is in operation, valve 25 in line 23 is closed and the brine in nucleus forming zone 15 is being cooled in accordance with known procedures to form ice nuclei within it. The amount of brine introduced into line 5 through line 22 is of no consequence but only the number of nuclei. Accordingly, it is not necessary to operate nucleus forming zones 11 and 15 with any degree of precision to produce nuclei at any given rate or, for that matter, of any given size. All that is required is that the nuclei be produced in one zone as rapidly as they are being removed from the other.

As the slurry of brine and ice nuclei flows from the inlet to crystal growth zone 6 toward the outlet, refrigerant is introduced through a sparger 26 so that the rate of refrigerant introduction is graduated to increase from the inlet to the outlet. The graduated increase is predetermined in the embodiment illustrated by providing a greater number of outlets from the sparger toward the outlet end of the crystal growth zone 6 than toward the inlet end, and this increased refrigeration capacity toward the outlet is predetermined on the basis of the greater heat load resulting from crystal growth toward the outlet of zone 6 as compared with the crystal growth toward the inlet. The refrigeration illustrated is effected by introducing into the brine a liquid material such as a low boiling hydrocarbon which vaporizes within the brine, absorbing heat of vaporization with consequent cooling the brine. Suitable hydrocarbons are propane, butane, and preferably hydrocarbon mixtures such as a mixture of butene and isobutane which will produce a tapered evaporation point and provide cooling during its entire transit through the brine. Another advantage of employing hydrocarbon gases as refrigerants is that the rising bubbles of gas create a vertical stirring effect that tends to make the temperature from the top to the bottom of the brine in crystal growth zone 6 uniform even through the temperature from the inlet toward the outlet decreases. The refrigerant introduction is controlled so that the temperature at any point in the crystal growth zone 6 is at least 0.2° F below the equilibrium freezing temperature at that point and not more than about 3° F below the freezing point.

The removal of brine-ice crystal slurry from crystal growth 6 is illustrated to be regulated by level control. Line 27 for removing slurry from zone 6 contains control valve 28 which operates responsive to a level sensing means 30. The slurry in line 27 is introduced into a separation zone 31 wherein brine is removed from the lower portion via line 32 and control valve 33, while ice floats to the surface and is removed over overflow baffle 35 and is carried out through line 36. Baffle 35 may be in the form of the entire top of the vessel, and ice may be made to overflow the baffle by use of a conventional plow which is not shown in this diagram. The brine level is maintained via level-sensing device 37 which actuates before-mentioned valve 33. A bed of ice rises above the level of the brine in separating zone 31, is washed with fresh water and urged over the baffle 35 with a plow.

Preferably separating zone 31 is provided with a horizontally expanded upper portion 38 in which the bed of ice crystals may expand horizontally and thereby loosen slightly to make the bed more permeable to washing water. Fresh water introduced through line 40 sprays through spray heads 41 and washes brine clinging to the surface of the individual ice crystals back into the brine so that very little is carried over into the product. The ice recovered through line 36 is melted in heat exchanger 42 and carried out as product through line 43. Preferably, a portion of the product from line 43 is drawn off through line 40 as a source of fresh water for washing the ice in the expanded portion 38 of the separation zone 31. Also, it is preferable that the heat exchanger 42 employs one of the process streams as a source of heat, such as the incoming brine or the coolant for the refrigerant to be described hereinafter. The concentrated brine from the process passes from separation zone 31 via line 32 and through heat exchanger 2 wherein it is employed to cool the incoming brine.

The refrigerant circuit in the illustrated embodiment employs a low boiling liquid hydrocarbon as described hereinabove. A source of the liquid refrigerant in vessel 45 is passed through line 46. Line 47 with control valve 48 supplies refrigerant to sparger 26 within crystal growth zone 6. Line 50 passing from line 46 supplies nucleus producing zone 15 with refrigerant when zone 15 is in a nucleus producing cycle. When no refrigerant is required for producing nuclei or when very little is required simply to maintain the temperature of zone 15, valve 51 may be closed or partially closed to accommodate to the conditions desired in zone 15. Similarly, line 52 and valve 53 supply refrigerant to nucleus producing zone 11.

The liquid phase refrigerant vaporizes as it cools the brine and as a consequence the circuit must be completed by vapor conducting lines from each of the zones to which refrigerant is supplied. Suitably valved line 55 from nucleus producing zone 11 and valved line 56 from nucleus producing zone 15 join in line 57 which passes through the suction side of compressor 58. Similarly, line 60 passes collected vaporized refrigerant from the top of crystal growth zone 6 and returns it to the suction side of compressor 58. Compressor 58 places the refrigerant under high pressure after which it is passed through line 61 to heat exchanger 62 where it is cooled to a liquification temperature and returned to capacity vessel 45. A suitable coolant is supplied to heat exchanger 62 to remove heat from the compressed hydrocarbon gases. One suitable economical heat exchange system involves heat exchange between heat exchanger 62 and heat exchanger 42 so that the heat removed from refrigerant in line 61 is supplied to melt ice in line 36. A suitable heat exchange medium that is noncorrosive and liquid phase at the temperature in both, preferably liquid phase in one and vapor phase in the other, may be employed by connecting the heat exchangers together so that line 63 conducts heat exchange medium from exchanger 42 to exchanger 62 while line 64 provides flow in the other direction. Since the heat requirements of both processes are probably not in balance, other sources of heat or coolant may also be employed in heat exchangers 62 and 64.

Figure 2:
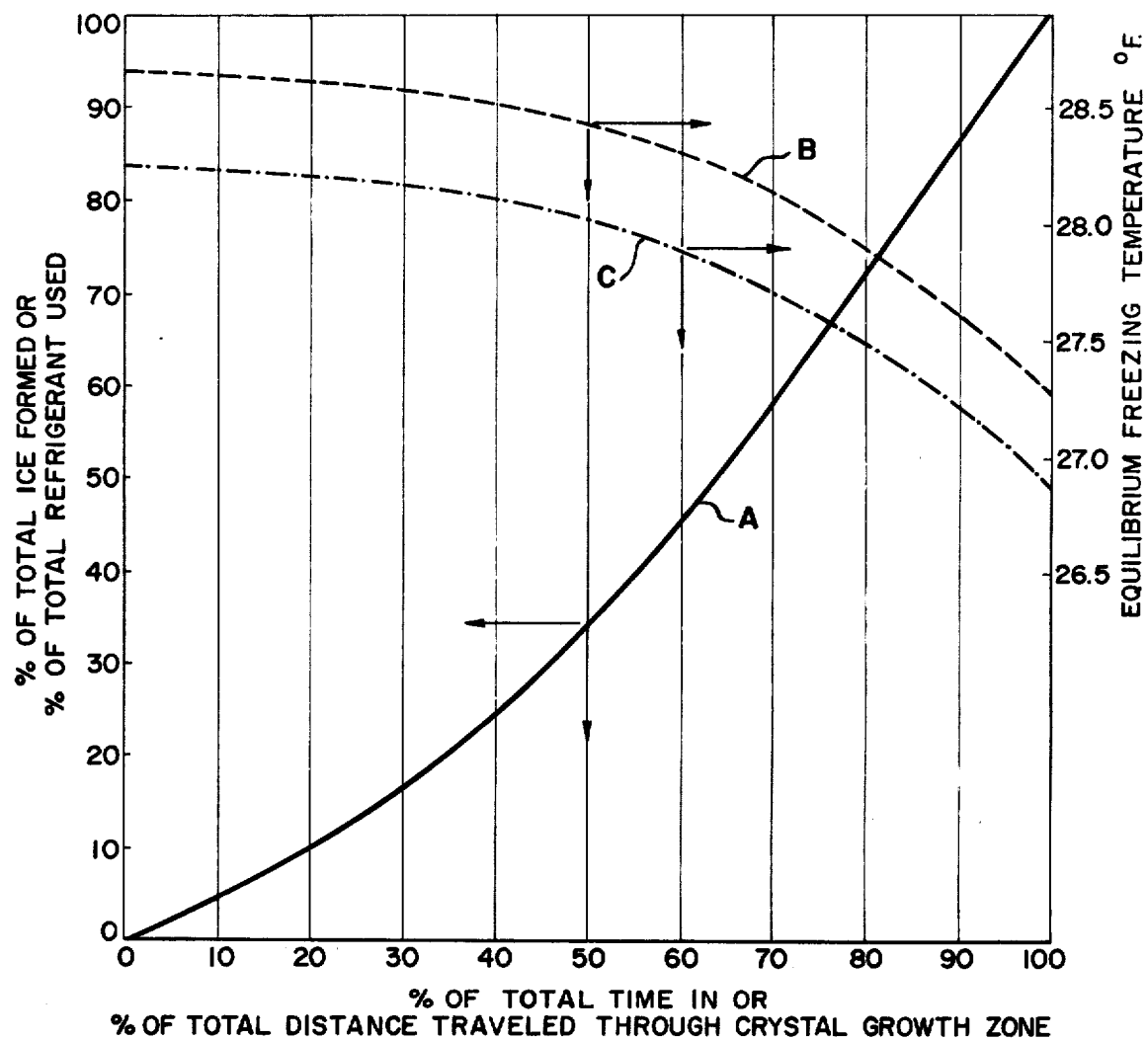
FIG. 2 is a plot of percent of total time in the crystal growth zone versus percent of total ice formed and versus equilibrium freezing temperature.

FIG. 2 is a graphic representation of the course of brine through the crystal growth zone in a particular system. Curve A in FIG. 2 is a plot of the relationship of time to total ice formed. The abscissa axis is the percent of time the brine spends in the crystal growth zone and the ordinate axis is the percent of total ice formed. Since flow through the crystal growth zone is substantially linear, the percent of time is substantially equivalent to percent of the distance travelled through the crystal growth zone and both of these perameters are indicated on the abscissa axis. The percent of total ice formed and the percent of total refrigerant used also are equivalent when the freezing process is effected in accordance with this invention because all ice formation is in the form of crystal growth which may be represented as refrigerant consumed except for the small amount of refrigerant consumed for the sensible heat required to lower the temperature of the brine a few degrees Fahrenheit. Both of these factors are accordingly illustrated on the ordinate axis.

It may be seen from curve A that ice is formed at an increasing rate as the brine slurry travels through the crystal growth zone. As explained above, constant crystal growth rate is related to the length of the major axis of the crystal. However, the volume of ice in the crystal varies as the third power of the length of the axis, and as a result a constant crystal growth rate results in an exponential ice production rate. For the specific system illustrated in FIG. 2, it may be seen that only 10% of the total ice produced is made in the first 20% of the time spent in the crystal growth zone, while the final 10% of the ice produced is made in the final 7.5% of the time spent in the crystal growth zone.

FIG. 2 also illustrates in curve B the relationship between the percent of time in the crystal growth zone and the equilibrium freezing temperature of the brine. It may be seen that as ice crystals grow, the brine becomes increasingly concentrated and its equilibrium freezing point becomes lower. The refrigerant supplied to the system must be sufficient to maintain the temperature throughout the crystal growth zone lower than the equilibrium freezing temperature in order to produce that degree of instability that is relieved by crystal growth alone. Curve C represents the temperature of the brine along its path of flow throughout the crystal growth zone. It is evident that enough refrigerant must be supplied to each increment of length of the crystal growth zone to remove the sensible heat required to lower the temperature and an additional amount to supply heat of solidification for the amount of ice formed. Curve C represents a preferred operation wherein the temperature of the brine is about 0.4° F below the equilibrium freezing temperature.

The system represented by FIG. 2 is one wherein sea water is passed through a crystal growth zone 20 feet long at a rate of 100 cu.ft. of sea water per minute. In the system nuclei of undetermined size grow to uniform sized crystals having a major axis of about 0.1 inch. The fresh water removed from the process is about 30%w of the total sea water fed.

From FIG. 2 it is clear that there must be a temperature gradient through the crystal growth zone and that refrigerant must be fed to the crystal growth zone throughout its length. It is important that the instability of the system at all points be within the above-noted limits to avoid stabilization by nucleus formation. It is important that the temperature of the brine at all points be less than 3.0° F lower than the equilibrium freezing point to avoid formation of unwanted nuclei, while enough instability for significant crystal growth to occur must be maintained by keeping the temperature of the brine at least 0.2° F below the equilibrium freezing point.

It is also evident that control of the size of the nuclei is unimportant and that only control of the number of nuclei is significant. The final ice crystals harvested from the process are so much larger than any nucleus inoculated into the feed stream that the amount of fresh water in the nucleus is of little significance to the yield from the process and that the size of the nuclei introduced is of little significance with regard to the size of the final crystals harvested. The important factor is that the total weight of fresh water removed from the brine be contained in a predetermined number of crystals because limiting the number of crystals and the amount of fresh water recovered results in a product that is uniform sized, large crystals that can be successfully harvested and washed to remove clinging brine and to produce a substantially uncontaminated fresh water product.

What is claimed is:

1. A process for recovering fresh water from brine comprising:
    A. cooling brine to about the freezing temperature,
    B. maintaining two, batch nucleus-forming zones,
    C. inoculating the brine with a predetermined number of nuclei of ice crystals, alternately from said two nucleus-forming zones,
    D. passing the inoculated brine through an elongated crystal growth zone from an inlet at one end thereof to an outlet at the other end thereof,
    E. supplying refrigerant to the crystal growth zone along substantially the entire path of flow of inoculated brine through the crystal growth zone at a rate such that the brine temperature in the crystal growth zone is from about 0.2° to about 3.0° F lower than the equilibrium freezing point of the brine at that point in the flow path, whereby crystal growth is effected substantially without the formation of nuclei,
    F. passing the resultant brine-ice mixture from the outlet of the crystal growth zone to a separation zone wherein ice crystals are separated from brine,
    G. washing the separated ice crystals with fresh water, and
    H. recovering fresh water from the ice crystals.

2. The process of claim 1 wherein cooling of brine is effected by heat exchanger with brine separated from the ice crystals.

3. The process of claim 1 wherein said refrigerant is a liquid that is vaporizable at brine freezing temperature and which is not soluble in brine, which is injected into the brine.

4. The process of claim 3 wherein the refrigerant is a mixture of butene and isobutane.

5. The process of claim 3 wherein said refrigerant is injected into the brine in the crystal growth zone at a graduated rate along the flow path of the brine with greater quantities being injected toward the outlet of the crystal growth zone.

6. The process of claim 1 wherein the brine temperature is maintained about 0.4° F below the freezing point of ice in said brine.

7. The process of claim 1 wherein the ice crystals are washed in the upper portion of the separation zone.

8. The process of claim 1 wherein the ice crystals are washed with a portion of the fresh water recovered from the process.

9. The process of claim 1 wherein the upper portion of the separation zone is horizontally expanded and washing of ice crystals is effected in the horizontally expanded portion.

* * * * *